United States Patent [19]

Marlett et al.

[11] 4,122,409
[45] Oct. 24, 1978

[54] METHOD AND APPARATUS FOR CONTROLLING THE INTENSITY OF A LASER OUTPUT BEAM

[75] Inventors: Calvin J. Marlett, La Crescenta; Edwin A. Reed, Upland; Richard C. Johnson, Pasadena, all of Calif.

[73] Assignee: Xerox Corporation, Stamford, Conn.

[21] Appl. No.: 665,594

[22] Filed: Mar. 10, 1976

[51] Int. Cl.² ............................................. H01S 3/10
[52] U.S. Cl. ............................ 331/94.5 M; 346/108; 365/215
[58] Field of Search ............... 331/94.5 M, 94.5 S; 250/199; 332/7.51; 340/173 LM; 315/307

[56] References Cited

U.S. PATENT DOCUMENTS

| | | | |
|---|---|---|---|
| 2,965,434 | 12/1960 | Downs | 346/110 R |
| 3,245,083 | 4/1966 | Wilson et al. | 346/109 |
| 3,657,707 | 10/1972 | McFarland et al. | 346/76 L |
| 3,806,762 | 4/1974 | Punis et al. | 315/307 |

Primary Examiner—William L. Sikes
Assistant Examiner—Marcus S. Rasco
Attorney, Agent, or Firm—Irving Keschner

[57] ABSTRACT

The output beam of a laser tube is modulated between a maximum intensity (lase) and minimum (no-lase) intensity levels by varying the laser tube current between corresponding values. The device for controlling the output beam comprises a single transistor provided in the current path of the laser tube, the current therethrough being controlled, or modulated, to provide the modulated laser beam. The device is capable of operating in a plurality of modes. In the preferred mode, an analog signal is coupled to the transistor control circuitry whereby the laser beam intensity is linearly modulated between the maximum and minimum levels to provide a laser beam having grey scale capabilities.

30 Claims, 5 Drawing Figures

METHOD AND APPARATUS FOR CONTROLLING THE INTENSITY OF A LASER OUTPUT BEAM

BACKGROUND OF THE INVENTION

Recently, Xerox Corporation, Stamford Connecticut, commercially introduced a facsimile device, sold under the trademark Xerox ® Telecopier ® 200 transceiver, which records on plain paper. The transceiver employs a low-energy helium-neon laser and uses the xerographic principle to receive and print messages on ordinary, unsensitized paper. The transceiver unit operates at the rate of 2 minutes per letter-sized document and includes alternate speed options which makes the unit compatible with other transceivers which operate at 4 and 6 minutes. Basically, when the transceiver is in the transmit mode, the laser provides a small stable beam of light to raster scan the original document. The reflected light is detected by a photosensor which translates the white and black of the document to electrical logic levels which may be transmitted by a phone line to a remote transceiver set to the receive mode. The receiver transceiver directs the laser beam onto a xerographic drum and by electrically modulating the laser with "1" and "0" logic levels in synchronism with the transmitter produces a copy of the original.

It would be desired that in addition to digitally modulating the laser beam to the full power level (maximum lasing beam intenstiy) or minimum power level (non-lase condition) that the laser beam would be controlled in a manner whereby the beam intensity is variable between the maximum and minimum power levels. This would allow the transceiver to operate at various switch selectable speeds without the use of additional optical and mechanical elements. In particular, at very slow speeds (high resolution) less laser beam intensity is required to write on the xerographic drum whereas for very high speeds (less resolution) greater laser beam intensity is required. The problem has been solved by introducing neutral density filters mechanically into the beam path as one selected the various operating speeds. However, the selection of the proper filter for a given transceiver unit and speed is very time consuming. Therefore, it has become apparent that an additional input signal that would electronically control the maximum intensity of the laser beam in accordance with the transceiver operating speed would be required. Further, if the additional input signal is analog, an additional benefit would be provided in that the analog input will linearly modulate the beam intensity between the minimum and maximum power levels whereby grey scale laser printing is provided. That is, the incoming data stream into the receive transceiver may contain information to turn on the laser beam and also indicate what the intensity of the laser beam should be similar to the manner in which television pictures are produced.

The prior art laser modulating devices, in general, modulate laser beams indirectly through optical manipulation, i.e., manipulating the light beam after it has left the laser. This technique is limited by the obvious difficulties of requiring additional optical hardware as well as the difficulty of coupling a high frequency modulating signal to the optical modulating means.

Direct modulation of a laser tube by varying the laser output power is described in U.S. Pat. No. 3,806,762. This patent describes a technique which utilizes a ballast resistor to reduce power dissipation by appropriate selection of impedance levels when one of two parallel impedance paths are coupled to the laser tube. The aforementioned patent briefly describes a technique for modulating the tube to provide different power levels between the on and off power levels by switching on a different current source, or a combination of such current sources. This technique therefore requires a plurality of current sources, coupled in a cascade arrangement, to provide an effective continuous analog control of the laser beam intensity.

SUMMARY OF THE PRESENT INVENTION

The present invention provides method and apparatus for modulating the intensity of a laser beam between maximum intensity and minimum (no-lase) intensity levels both analog and digitally, the former providing grey scale capabilities. In particular, the output beam of a laser tube is modulated between maximum and minimum power levels by varying the laser tube current between corresponding values. The device for controlling the output beam comprises a single transistor provided in the current path of the laser tube, the current therethrough being controlled, or modulated, to provide the modulated laser beam. The device is capable of operating in a plurality of modes. In the preferred mode, an analog signal is coupled to the transistor control circuitry whereby the laser tube current is linearly modulated between the maximum and minimum current levels to provide a laser beam having grey scale capabilities. In a second operating mode, a digital signal is coupled to the transistor control circuitry whereby the laser beam intensity is modulated to a constant value between the maximum and minimum levels. In both modes, the maximum level is variable in accordance with operating conditions external to the device.

It is an object of the present invention to provide method and apparatus for directly controlling the intensity of a laser beam.

It is a further object of the present invention to provide a device for directly modulating the intensity of a laser beam between minimum (no-lase) and maximum (lase) levels, the maximum level being variable in accordance with operating conditions external to the device.

It is still a further object of the present invention to provide method and apparatus for directly modulating the intensity of a laser beam between maximum and minimum power levels in either analog or digital modes of operation, the analog mode enabling the laser beam intensity to be linearly modulated between the minimum and maximum levels in accordance with the magnitude of the analog signal, the laser beam, when utilized for printing applications, thereby having grey scale capabilities.

It is a further object of the present invention to provide method and apparatus for controlling the current through a laser tube whereby the intensity of the laser output beam is controlled between maximum and minimum power levels by controlling the current carrying capabilities of a single transistor positioned in the current path of the laser tube.

BRIEF DESCRIPTION OF THE DRAWINGS

For a better understanding of the invention as well as other objects and further features thereof, reference is made to the following description which is to be read in conjunction with the following drawings wherein.

DESCRIPTION OF THE PREFERRED EMBODIMENT

Figure 1:
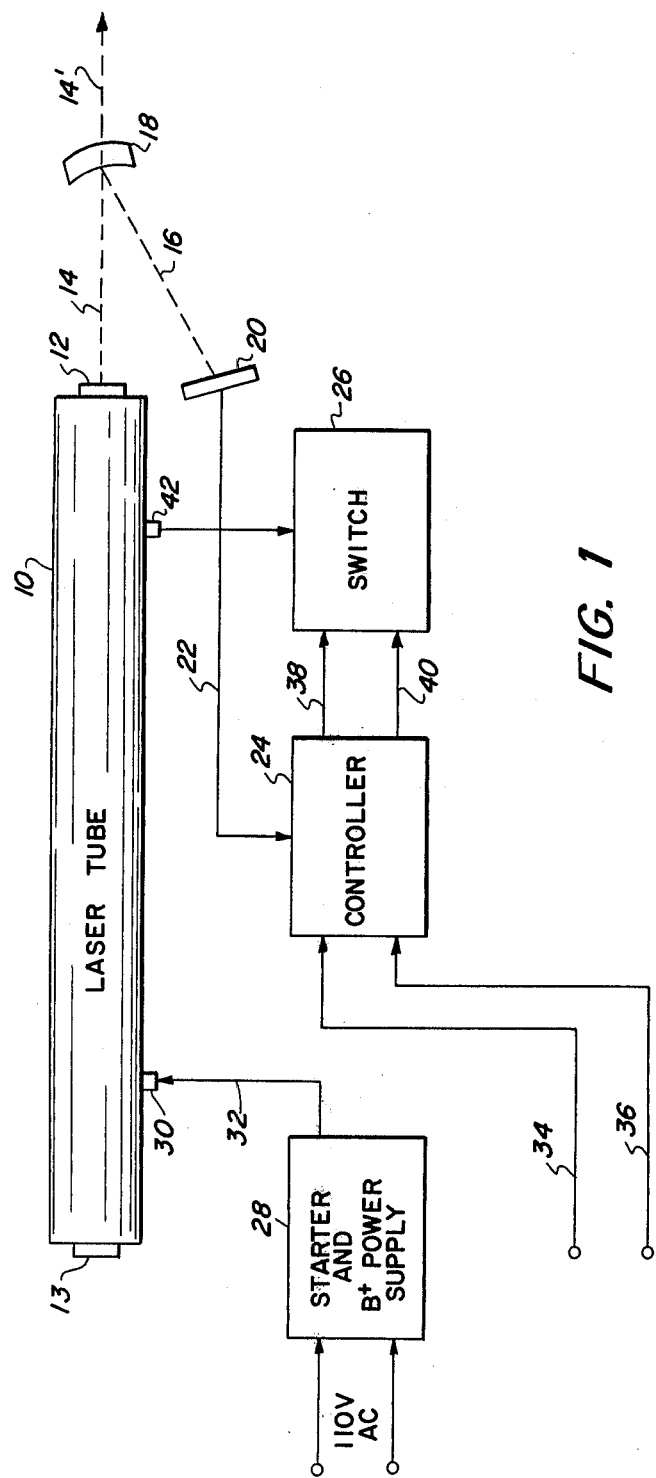
FIG. 1 is a block diagram of the laser control system in accordance with the teachings of the present invention.

Referring now to FIG. 1, a block diagram of the laser control system in accordance with the teachings of the present invention is shown. In particular, a laser discharge tube 10, shown in representation form, has end mirror assemblies 12 and 13 associated therewith. Laser discharge tube 10 may comprise a helium-neon gas laser which, when energized, generates red light at a wavelength of 6328Å. Laser 10 generates an output beam 14 of coherent, monochromatic radiation at the aforementioned wavelength, a portion 16 of beam 14 being reflected by lens 18 onto a feedback detector 20 which may comprise a standard photodiode. The nonreflected, or transmitted, portion 14' of beam 14 is available for utilization, such as for example, in the transceiver device described hereinabove. The output of photodetector 20 on lead 22 is an electrical current signal the magnitude of which is proportional to the intensity of the laser beam 16 incident on feedback detector 20. The signal on lead 22 is applied to a controller 24 which, as will be described hereinafter in more detail, controls the signal applied to a switch 26, switch 26 determining the magnitude of the current flowing through laser tube 10. Also shown in FIG. 1 is a laser input power device 28 which comprises a circuit for initiating the laser discharge and the DC power supply required to maintain the laser tube operable after the discharge is initiated. A source of 110 or 115 volts A.C. is coupled to device 28, the output thereof being connected to the laser tube anode pin 30 via lead 32. As will be explained in more detail thereinafter with reference to FIG. 4, a digital logic input is applied to controller 24 via lead 34 and an analog or digital input is applied thereto via lead 36. A corresponding digital logic and analog or digital signal appears on leads 38 and 40, respectively. Although not shown in the Figure, ±15 volts DC, a circuit ground and a chassis ground are also applied to controller 24.

In operation, the starter circuit portion of device 28 automatically supplies high voltage pulses to the laser tube 10 to initiate the discharge, the discharge being sustained by the high voltage DC power supply within device 28. After the discharge is initiated, the starter circuit is bypassed. Controller 24 accepts the digital logic and analog or digital inputs on leads 34 and 36, respectively, and generates the corresponding signals on leads 38 or 40, or both, which controls the current in laser tube 10 via switch 26. In particular, switch 26 controls the current output drawn from the laser cathode pin 42 which, in turn, controls the intensity of output laser beam 14.

Figure 2A:
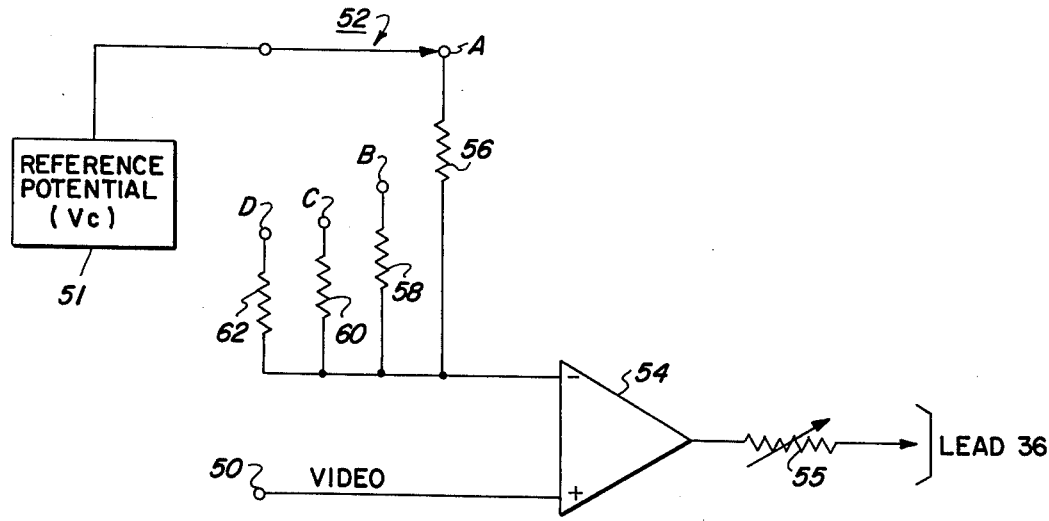
FIG. 2A is a simplified diagram showing the manner in which signal levels are provided to the laser control system of the present invention and FIG. 2B shows the typical signal levels generated by the system of FIG. 2A.

FIG. 2A, and the description thereof which follows hereinafter, is set forth in simplified form to illustrate the manner in which operating signals are provided to the laser control system shown in FIG. 1. When the laser control system shown in FIG. 1 is utilized as a transceiver receiver of the type set forth hereinabove, video signals are provided at a terminal 50 in the receiver, and represent the information on a document scanned by a facsimile device at a remote location. The facsimile device when operated in the transmit mode generates a signal by systematically scanning the original document and producing a current corresponding to its light intensity variations. The video signal, in accordance with the multi-mode operating capabilities of the present invention, may either be pure video (i.e. analog) or a video signal which has been digitized. Since, as set forth hereinabove, it is desired that the maximum laser beam intensity be controlled, or limited, by the operating speed of the transceiver, a manually operated rotary switch 52 having positions A, B C and D (corresponding to four operating speeds although provision for additional speed selection can obviously be provided) is provided. By moving the switch to either position A, B, C, or D, a source 51 of reference potential Vc is coupled to one input of operational amplifier 54 via resistors 56, 58, 60 or 62. If it is assumed that position A corresponds to the fastest operating speed, position D corresponds to the slowest operating speed and positions B and C are intermediate speeds, the values of resistances 56, 58, 60 and 62 are selected so that the maximum output of amplifier 54 corresponds to the maximum power from laser 10 (corresponding to 8 milliamps tube current as set forth with reference to FIG. 3 hereinafter) when switch 52 is at position $a$ and the maximum output of amplifier 54 corresponds to a proportionally smaller value of beam power from laser 10 when switch 52 is at positions $b$, $c$ and $d$. It should be noted that if a video signal is not present at lead 50, the output from amplifier 54 is selected to be at a value whereby laser 10 is non-lasing. The output from amplifier 54 is applied to lead 36 via variable resistor 55, resistor 55 functioning as a calibration resistor to provide the appropriate current levels to the follow-on laser control system thereby matching a particular transceiver to the laser tube 10 being utilized.

Figure 2B:
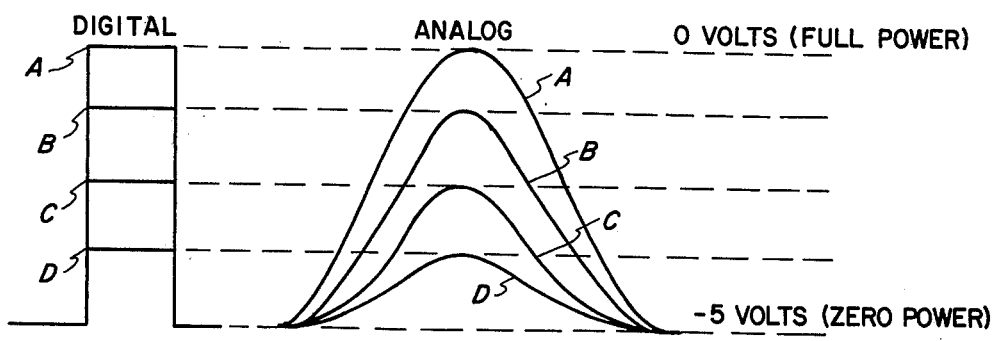

FIG. 2B illustrates the voltage levels at the output of amplifier 54. The maximum magnitude of the video pulses and pure video (analog) signals are shown to be dependent upon the operating speed selected. For example, for the fastest operating speed, switch 52 is rotated to position A and, in the digital mode, a pulse of an amplitude to provide maximum beam intensity (corresponding to a tube current of 8 milliamps) can be transmitted by amplifier 54. In the analog mode, the video signal is linearly modulated in accordance with the information contained on the scanned document, the maximum amplitude thereof similarly corresponding to the full laser beam intensity. As will be set forth in more detail hereinafter, full power, or maximum laser beam power in a selected operating speed condition, is obtained when a digital logic "1" is applied to lead 34. When the voltage level at the output of amplifier 54 reaches 0 volts, the only laser tube current is that produced by the digital logic "1" signal which, again, provides the maximum laser beam intensity by causing 8 milliamps of current to flow through laser tube 10.

Figure 3:
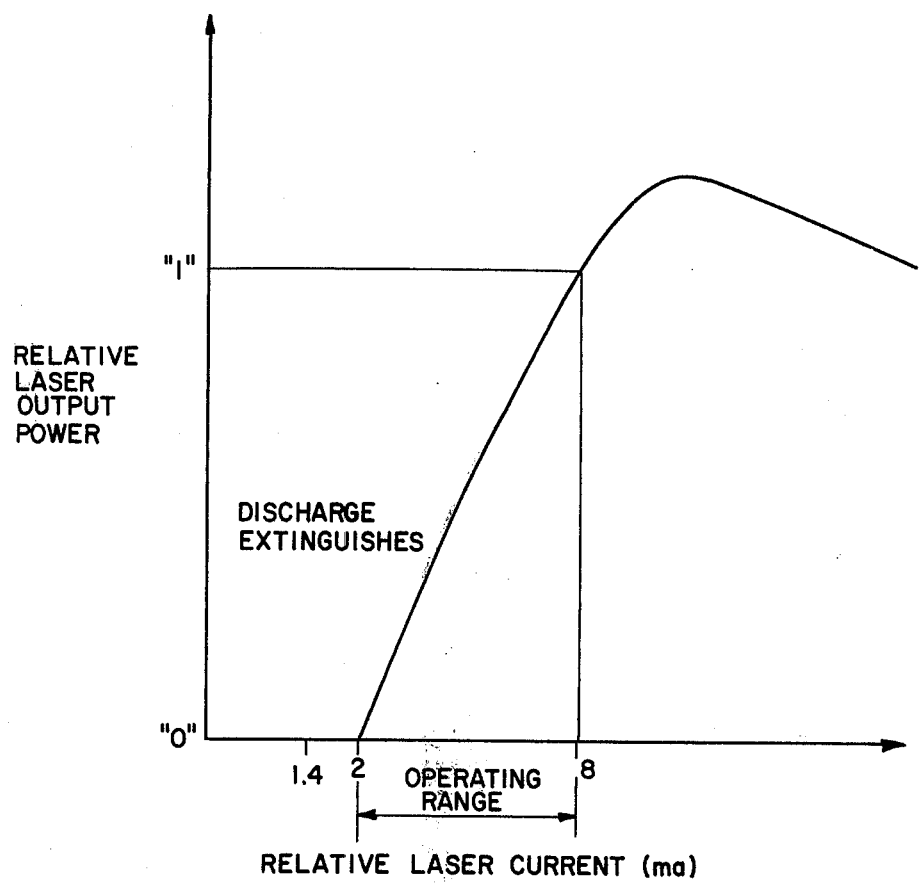
FIG. 3 is a graph illustrating laser output power (beam intensity) as a function as laser tube current.

FIG. 3 shows the laser output power curve as a function of laser current. The current shown is typical for a helium-neon laser operated in an enhancement mode i.e. wherein output power increases with increasing current. It is well recognized in the laser art that output power is directly related to the intensity of the laser output beam and therefore control of laser output power implies control of beam intensity and vice versa. As illustrated by the curve, the laser tube turns off (ceases to transmit a light output) for laser current levels below approximately 2 milliamps. For increasing tube current above 2 milliamps, the power rises approximately linearly until it reaches a knee at about 8 milliamps. Below 2 milliamps (approximately 1.4 milliamps) the discharge in laser tube 10 is extinguished. For the purposes of the system described herein, a digital logic "1" is present when the laser is modulated to an "on" state (at 8 milliamps), and a digital logic "0"]is present in the system when the laser is modulated to the "off" state (approximately 2 milliamps). At the point corresponding to logic "0" the laser tube ceases to lase (i.e. no light output) even though there is a tube discharge. If the current in the tube is further reduced to approximately 1.4 milliamps, the discharge is extinguished. As will be explained hereinafter, digital signals applied to controller 24 via lead 34 causes the laser 10 to switch between the "lase" and "no-lase" power levels. The digital logic input controls the current in laser tube 10 via switch 26. When the digital logic input is "1" the laser current is at the maximum intensity level (lase condition). When the digital logic input is "0" the laser current is at the minimum intensity level (no-lase condition). The digital logic input is a control signal to maintain the transceiver in the "on" operating mode (lase condition) at logic "1" and in the "off" operating mode (no-lase condition) at logic "0". The digital logic input signal may be generated by any conventional means not shown whenever it is desired to place the transceiver in the "on" or "off" operating modes. It should be noted that when the transceiver is in the receive mode wherein the laser writes (or prints) on a responsive medium, digital logic "1" may be applied to lead 34, to maintain the transceiver in the "on" operating mode, the signal on lead 36 essentially controlling the amplitude of the logic "1" input. The digital signals on lead 34, however, interact with the analog or digital signals applied to controller 24 on lead 36 such that a "0" command on the digital input lead 34 overrides any analog or digital signal on lead 34. However, with a "1" on the digital input lead 34, an analog input on lead 36 can linearly control the laser over the linear operating range of the laser (2 milliamps to 8 milliamps). The stability of the digital "1" logic power and the linearity of the analog control is accomplished via the feedback detector circuit. As explained hereinabove with reference to FIG. 1, the output beam is sampled with a detector 20, a portion 16 of beam 14 being fed back to controller 24 via lead 22 thereby automatically adjusting the current through switch 26 to maintain the laser power output at the level determined by the analog and digital inputs. As set forth hereinabove, a digital signal may be applied to lead 36, the digital signal providing a laser beam intensity in the range corresponding to a "no-lase" condition (2 milliamps) to an intensity on the operating range of the laser corresponding to the amplitude of the digital pulses comprising the digital signal.

Figure 4:
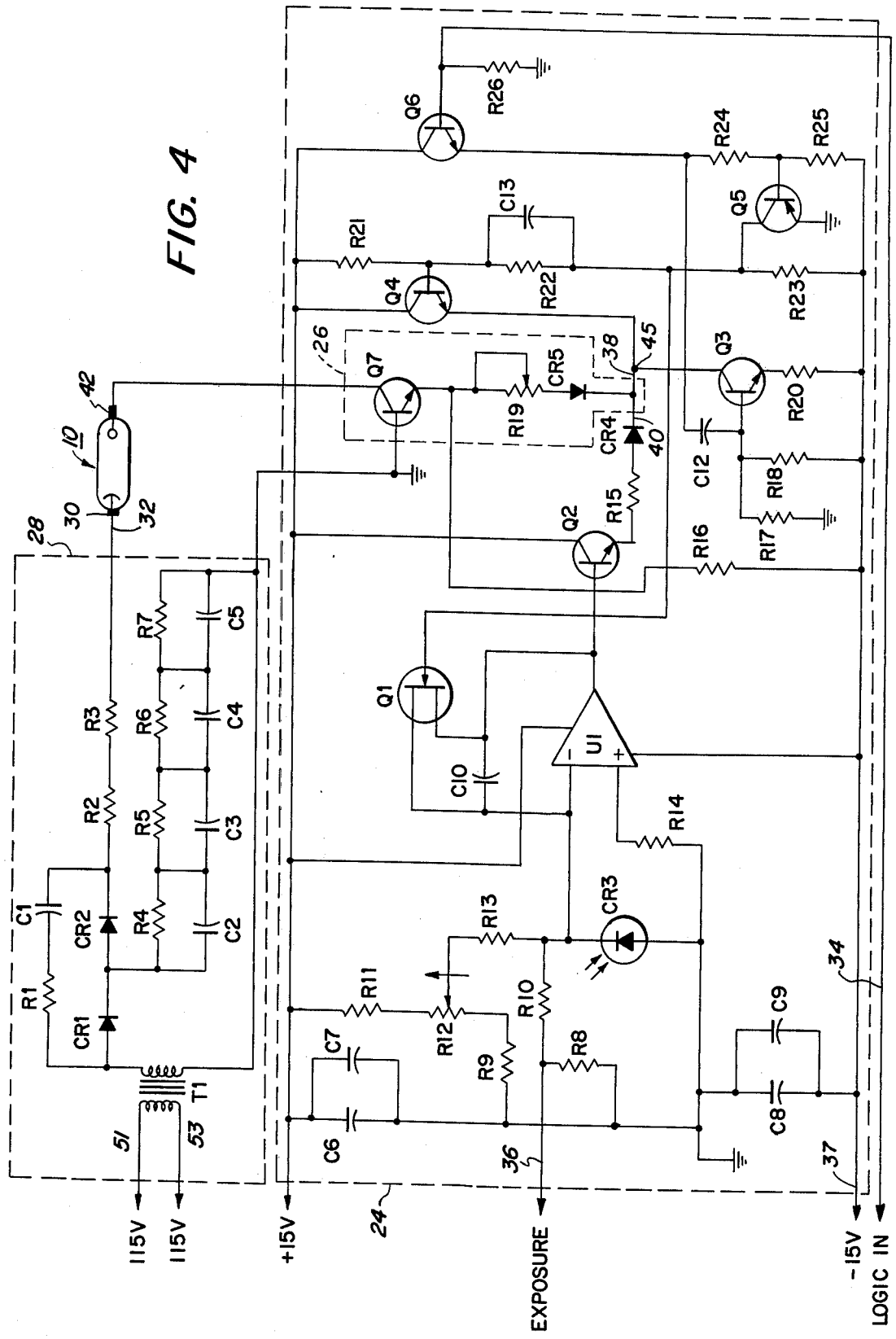
FIG. 4 is a schematic diagram of the block diagram shown in FIG. 1.

FIG. 4 is a schematic diagram of the block diagram of FIG. 1, the blocks of the latter being illustrated by the dashed lines in FIG. 4. The starter circuit comprises resistors R1, capacitor C1 and diode CR2. The power supply comprises a step-up transformer T1 which operates to increase the input 115 volt alternating current voltage to a higher voltage such as 900 volts RMS. The rectifying circuitry comprises diode CR1 and cascade resistors R4, R5, R6, R7 and capacitors C2, C3, C4 and C5 connected as shown. Resistors R2 and R3 comprise the ballast resistors and operate to limit the amount of current through plasma tube 10. As shown, the ballast resistor R3 is coupled to the anode pin 30 of the discharge tube 10 via lead 32. The cathode pin 42 of plasma tube 10 is connected to the collector of transistor Q7. The base electrode of transistor Q7 is coupled to ground and the emitter thereof is coupled to a resistor R16 and to the anode of diode CR5 via variable resistor R19. The digital input lead 34 is coupled to the base of a transistor Q6, the base thereof being coupled to ground via resistor R26. The current output of photodetector CR3, which is proportional to the light intensity thereon, is coupled to the negative input of operational amplifier U1. The analog or digital input on lead 36 is also coupled to the negative input of operational amplifier U1 via resistor R10. The output of operational amplifier U1 is coupled to the drain electrode of field effect transistor (FET) Q1 with the negative input of operational amplifier U1 being coupled to the source electrode of the FET, capacitor C10 being connected between the source and drain electrodes of FET Q1. The gate electrode of FET Q1 is coupled to the collector of transistor Q5. Resistors R17 and R18 form a voltage divider, dividing the negative supply voltage applied to lead 37. This establishes a predetermined voltage drop across resistor R20 which, in turn, establishes the maximum current that transistor Q3 will try to maintain, this maximum current corresponding to the maximum "1" logic current which may be modified towards the minimum, or logic "0" current, via CR4 and Q4 as will be set forth hereinafter. In other words, since constant current is being drawn through the collector of transistor Q3, the current drawn through CR4 and the emitter of Q4 will, in essence, determine the current through CR5 (transistor Q7) and through the plasma tube 10 because Q3 tries to maintain the maximum current therethrough. In order to modify the current through plasma tube 10, other than the maximum current, the output of operational amplifier U1 supplies modifying current to CR4 by increasing the voltage at the base of transistor Q2, the current flowing through the emitter of transistor Q2 being transmitted via resistor R15 and diode CR4 to the node point 45 between CR4, CR5 and the emitter of transistor Q4 in a manner and polarity whereby the current through transistor Q7 is reduced to an amount whereby the laser tube current is less than the maximum current. As set forth in reference to FIG. 3, the maximum current is selected to be approximately 8 milliamps. As can be observed from the circuit of FIG. 4, some current is necessary to flow through Q7 to satisfy the requirements of R16 which determines the logic "0" current value since approximately 15 volts is applied across an essentially grounded resistor R16. This voltage across R16 establishes a minimum laser tube current of approximately 2 milliamps. For example, if current of approximately 2 milliamps is always flowing through resistor R16, and it is assumed that transistor Q3 has been set for maximum logic current (6 milliamps), therefore if 4 milliamps is supplied through transistor Q2 to diode CR4 into the circuit which includes transistor Q3, this means that only two milliamps will be allowed to flow in the plasma tube cathode circuit (R19 channel) in addition to the "0" logic current through transistor Q7 and resistor R16 when a digital logic "1" is applied to lead 34. In other words, current is subtracted from the maximum laser tube current drawn through the R19 channel into the Q3 circuit. It should be noted that the current through the emitter of Q7 carries both the laser tube current and the Q7 base current. Therefore, the laser tube current is essentially equal to the Q7 emitter current. The controller feedback circuit includes FET Q1, photodetector CR3 and operational amplifier U1. The circuit is turned on digitally by energizing input lead 34 with a digital logic "1". Minimum current is obtained by applying a logic "0" (0 volts) to lead 34 which turns off transistor Q6 If Q6 is off then the base of Q5 is at a negative potential and Q5 conducts. Since the emitter of Q5 is grounded, the collector of Q5 is essentially at ground which is a tie point between resistors R22 and R23. With this tie point essentially grounded the base of Q4 is more positive than the emitter of Q4 and therefore Q4 conducts. Transistor Q4 is adjusted such that a full 6 milliamps current is supplied through its emitter into the collector of transistor Q3. This in essence supplies the maximum 6 milliamps current normally drawn through transistor Q3 which means that no other current is applied to the Q3 circuit from any other path, since at this point when digital logic "0" is applied no current is drawn through the R19 path (channel) since CR4 and CR5 are turned off (reverse-biased). Transistor Q4 is turned off when a digital logic "1" is applied to lead 34 and the circuit parameters are arranged such that the total current flowing through the R19 channel is approximately equal to 6 milliamps so that the total current flowing through transistor Q7 is equal to the minimum current of 2 milliamps through R16 plus the current through the R19 channel, or approximately 8 milliamps, which is the maximum current drawn through transistor Q7 and through the cathode of laser tube 10.

Referring more specifically to the operation of the laser circuit shown in FIG. 4, 115 volts AC is applied to the circuit via input leads 51 and 53. This voltage is stepped through transformer T1 to approximately 900 volts RMS which is the voltage necessary to drive the laser plasma tube 10. The alternating 900 volts is rectified by diode CR1 and circuitry including CR1, CR2, R1, and C1 acts as a voltage doubler that initiates the discharge in the plasma tube 10. R2 and R3 are the ballast resistors which limit the current in the plasma tube 10. Resistors R3, R4, R6 and R7 and capacitors C2, C3, C4 and C5 function as filters and essentially maintains a constant output voltage notwithstanding the transitions of voltage on the AC input line. Capacitor C1 normally charges to approximately 2½ kilovolts which is added to the voltage between diode CR1 and CR2 i.e., approximately 1100 volts and the approximately 3 to 3½ kilovolts voltage at that point is applied to the plasma tube to initiate the discharge. R1, which is approximately 3.9 megohms, limits current through C1 to approximately 600 microamps. In essence, it is a very high impedance circuit and the path including resistor R1 and capacitor C1 is bypassed after the initial discharge of plasma tube 10, CR2 being forward biased. Transistor Q7 essentially functions as a switch to control the plasma tube current to correspond to either a "0" logic or "1" logic or some intermediate current point determined by operational amplifier U1. Transistors Q5 and Q6 basically function as level shifting devices to provide the proper voltage level at the base of transistor Q4 such that a digital logic input at lead 34 can provide the logic "0" or logic "1" functions when switched between 0 volts and approximately 2½ volts, respectively. In essence, if the voltage on lead 34 is a 2½ volts, which corresponds to logic "1", this voltage will turn on transistor Q6 and the emitter current flowing through Q6 causes an increase in voltage across the voltage divider comprising resistors R24 and R25 to turn transistor Q5 off, whereby the collector of transistor Q5 is at a negative potential which is a tie point between resistors R22 and R23. With this point negative the voltage divider formed by resistors R21 and R22 is at a negative voltage which functions to turn off transistor Q4.

A reference voltage is applied to photodetector CR3 via resistances R11, R12, R13 and R9. The output adjust potentiometer R12 is the reference voltage pick-off point which is supplied through resistor R13 to the cathode of the photodetector CR3. The cathode of the photodetector is also coupled to the negative input of the operational amplifier U1. The positive input of the operational amplifier U1 is referenced, via resistor R14, to the anode of photodetector CR3 and also to ground. The photodetector CR3 generates current proportional to the intensity, or amount of light, incident thereon. That current is counteracted by a reference current that has been established via the aforementioned reference voltage, and is being maintained by the operational amplifier U1 which controls the laser tube 10 to supply the photodetector with the current that is required to satisfy the reference voltage in a typical feedback circuit arrangement. The operational amplifier U1 controls the laser current through the tube 10 by having its output coupled through transistor Q2, transistor Q2 acting as an emitter follower, transistor Q2 also providing the capability of generating more than 50 milliamps of current which provides the additional current to control laser tube 10. FET Q1 functions to short out capacitor C10, in turn shorting the input to the output of the operational amplifier U1. The gate electrode of this FET is controlled by the digital input applied to lead 34. When the circuit is in a digital logic "0" condition, i.e., it is required that no laser light be produced, no current is generated by the photodetector CR3. If the operational amplifier U1 was not controlled in this way, it would saturate in the logic "0" condition due to no current from CR3 to counteract the current from R13. With the laser tube 10 producing light, i.e., digital logic "1" applied to lead 34, the bias on gate electrode of FET Q1 is such that an open circuit is provided thereby allowing the operational amplifier U1 to operate in its normal mode, capacitor C10 slowing down the response of operational amplifier U1 as it comes into operation. Capacitor C11 serves to set the response curve of operational amplifier U1 and to provide stable operation.

The analog or digital input on lead 36 is applied to the input of operational amplifier U1 via resistor R10. The analog or digital signal on lead 36 operates to control the exposure level of the laser tube 10 and operates to modify the reference current applied to the operational amplifier U1. In the preferred mode of operation, an analog signal is applied to lead 36. The analog input, in essence, is generated by the transmitting portion of a facsimile device at a remote location, for example, when an input document is scanned by a laser beam. Where it is desired to provide a grey scale control of the output i.e., to have variations of tone of the output which compares to the image being scanned, it would be necessary to have an analog or grey scale control of the output laser beam instead of only having a black and white output copy which is produced by only having digital control of the output i.e., logic "0" corresponding to the scanning of grey or black on the document and logic "1" corresponding to white areas on the document by applying a digital pulse signal to lead 36. In the digital mode, the video signal generated from scanning the input document is converted essentially to digital pulses of a predetermined amplitude which are applied to lead 36. In an analog mode of operation, the relatively pure analog signal output from the scanning photodetector is transmitted to the receiving transceiver and applied to lead 36, the intensity of the laser output beam being variable over the operating range (corresponding to a laser tube output current range of 2 to 8 milliamps) shown in FIG. 3. The analog, or grey scale, control is provided since in facsimile devices utilizing a recording surface responsive to a laser beam, the tonal variations of the output copy is directly related to the intensity of the laser beam.

The digital logic inputs applied to lead 34 also function to control the laser beam intensity, as described hereinabove, and effectively provide a third mode of laser beam control. However, when the laser tube is being utilized as a printer (receiver mode), the signal on this lead is supplied by the transmitter transceiver to blank or unblank the laser in accordance with the document information being scanned.

The stability of the digital "1" logic power and the digital pulses applied to exposure control lead 36 and the linearity of the analog signal is accomplished via the feedback detector circuit as described hereinabove. The output laser beam is sampled by photodetector CR3 and the signal is fed back to the operational amplifier U1 shown in FIG. 3 are as follows (resistances in kilohms and capacitances in picofarads):

| | | |
|---|---|---|
| $R_1 = 3900$ | $R_{14} = 19$ | $C_1 = .001$ |
| $R_2 = 15$ | $R_{15} = .100$ | $C_2 = 10$ |
| $R_3 = 15$ | $R_{16} = 9.1$ | $C_3 = 10$ |
| $R_4 = 680$ | $R_{17} = 6.2$ | $C_4 = 10$ |
| $R_5 = 680$ | $R_{18} = 18$ | $C_5 = 10$ |
| $R_6 = 680$ | $R_{19} = .100$ | $C_6 = 10$ |
| $R_7 = 680$ | $R_{20} = 1.5$ | $C_7 = .01$ |
| $R_8 = 6.8$ | $R_{21} = 13$ | $C_8 = 12$ |
| $R_9 = 12$ | $R_{22} = 4.7$ | $C_9 = .01$ |
| $R_{10} = 47$ | $R_{23} = 3.3$ | $C_{10} = 470$ |
| $R_{11} = 220$ | $R_{24} = 680$ | $C_{11} = 10$ |
| $R_{12} = 5$ | $R_{25} = 22$ | $C_{12} = 390$ |
| $R_{13} = 47$ | $R_{26} = 8.2$ | $C_{13} = .001$ |

While the invention has been described with reference to its preferred embodiment, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. Apparatus for controlling the intensity of the light output from a laser comprising:
   laser means having a light output which varies as a function of a current therethrough for providing a light output which can be intensity modulated between first and second intensities by controlling said current between first and second levels;
   switch means coupled to said laser means and responsive to first and second control signals for controlling the current flowing through said laser means;
   means for applying said first control signal to said switch means, said switch means responding to said first control signal by causing said current to be at said first level when said first control signal is at a first value, and at said second level when said first control signal is at a second value; and
   means for applying said second control signal to said switch means when said first control signal of said second value is applied to said switch means for causing said switch means to modulate said current between said first and second levels.

2. The apparatus as defined in claim 1 wherein said first control signal is a digital logic signal.

3. The apparatus as defined in claim 2 wherein said second control signal is an analog signal.

4. The apparatus as defined in claim 2 wherein said second control signal is a digital signal.

5. The apparatus as defined in claim 3 wherein said switch means responds to the magnitude of said analog signal by causing said current to vary between said first and second levels in accordance with the magnitude of said analog signal.

6. The apparatus as defined in claim 4 wherein said switch means responds to the magnitude of said second control signal by causing said current to be maintained at a constant value between said first and second levels, said constant value being dependent on the magnitude of the second control signal.

7. The apparatus as defined in claim 1 wherein switch means responds to said first value of said first control signal by causing said current to be maintained at said first level when said first control signal of said first value is applied to said switch means, said second control signal applied to said switch means not effecting said current.

8. The apparatus as defined in claim 7 further including feedback means for maintaining the laser light output intensity at a predetermined value.

9. The apparatus as defined in claim 8 wherein said feedback means comprises first means responsive to the laser light output for generating a feedback intensity signal the magnitude of which is proportional to the intensity of the laser light output, means responsive to said second control signal for generating a desired intensity signal which corresponds to a desired laser light output intensity and third means for comparing said feedback intensity and desired intensity signals and generating a signal representing the difference between said feedback and desired signals, said difference signal being coupled to said switch means whereby the current through said laser means is adjusted such that said difference signal is reduced substantially to zero.

10. The apparatus as defined in claim 1 wherein said laser means includes a cathode electrode associated therewith and said switch means comprises a transistor the collector electrode of which is connected to said cathode electrode, the current through said laser means being carried by the emitter of said transistor.

11. The apparatus as defined in claim 10 further comprising means connected to said emitter electrode for maintaining a first current through said transistor emitter electrode, the first current being constant and corresponding to the current required to operate said laser means at said first intensity and means connected to said emitter electrode for maintaining a second current through said transistor emitter electrode, the second current being variable from approximately zero to a value whereby the sum of said first and second currents corresponds to the current required to modulate said light output between said first and second intensities.

12. Laser apparatus having digital and analog modes of operation whereby the light output intensity of a laser, in the digital mode, is modulated to a constant value between first and second intensities and whereby the light output intensity of the laser, in the analog mode, is linearly modulated between first and second intensities comprising:

a laser having a light output which varies as a function of current therethrough for providing a light output which can be intensity modulated between first and second intensities by controlling said current between first and second levels;

switch means coupled to said laser means for controlling the current flowing therethrough;

means for applying a first digital control signal of a first value to said switch means, said switch means responding to said first digital control signal by causing said current to be at said second level; and means for applying in said digital mode of operation a second digital control signal to said switch means, said switch means responding to said second digital control signal by causing said current to be altered to a constant value between said first and second levels dependent upon the magnitude of said second digital control signal and for applying in said analog mode of operation an analog control signal to said switch means, said switch means responding to said analog control signal by causing said current to be modulated between said first and second levels in accordance with the magnitude of said analog signal.

13. The apparatus as defined in claim 12 further including feedback means for maintaining the laser light output intensity at a predetermined value.

14. The apparatus as defined in claim 13 wherein said maintaining means comprises first means responsive to the laser light output and generating a first signal the magnitude of which is proportional to the intensity of the laser light output, means responsive to said second digital and analog control signals for generating a second signal which corresponds to a desired laser light output intensity and third means for comparing said first and second signals and generating a signal representing the difference between said first and second signals, said difference signal being coupled to said switch means whereby the current through said laser means is adjusted such that said difference signal is reduced substantially to zero.

15. The apparatus as defined in claim 12 wherein said laser includes a cathode electrode associated therewith and said switch means comprises a transistor the collector electrode of which is connected to said cathode electrode, the current through said laser being carried by the emitter of said transistor and controlled in a manner whereby the laser light output intensity is controlled.

16. The apparatus as defined in claim 15 further comprising means connected to said emitter electrode for maintaining a first current through said transistor emitter electrode, the first current being constant and corresponding to the current required to operate said laser at said first intensity, and means connected to said emitter electrode for maintaining a second current through said transistor emitter electrode, the second current being variable from approximately zero to a value whereby the sum of said first and second currents corresponds to the current required to operate said laser at said modulated intensity.

17. A method for controlling the light output from a laser comprising the steps of:

generating a light output from said laser which varies as a function of current therethrough for providing a light output which can be intensity modulated between first and second intensities by controlling said current between first and second levels;

providing a switch coupled to said laser for controlling the current flow therethrough;

applying a first control signal to said switch, said switch means responding to said first control signal by causing said current to be at said first level when said first control signal is at a first value, said current being at said second level when said first control signal is at a second value; and applying a second control signal to said switch when said first control signal of said second value is applied to said switch for causing said switch to modulate said current between said first and second levels.

18. The method as defined in claim 17 wherein said first control signal is a digital signal.

19. The method as defined in claim 18 wherein said second control signal is an analog signal.

20. The method as defined in claim 19 wherein said second control signal is a digital signal.

21. The method as defined in claim 19 wherein said laser light output intensity varies between said first and second levels in accordance with the magnitude of said analog signal.

22. The method as defined in claim 20 wherein said laser light output intensity is maintained at a constant value between said first and second levels, said constant value being dependent on the magnitude of the second control signal.

23. The method as defined in claim 17 wherein said laser light output intensity is maintained at said first level when said first control signal of said first value is applied to said switch, said second control signal applied to said switch not effecting the laser light output intensity.

24. The method as defined in claim 23 including the step of maintaining the laser light output intensity at a predetermined value.

25. The method as defined in claim 24 wherein said laser includes a cathode electrode associated therewith and said switch comprises a transistor the collector electrode of which is connected to said cathode electrode, the current through said laser being carried by the emitter of said transistor and controlled in a manner whereby the laser light output intensity is controlled.

26. The method as defined in claim 25 further including the steps of maintaining a first current through said transistor emitter electrode, the first current being constant and corresponding to the current required to operate said laser at said first light intensity, and maintaining a second current through said transistor emitter electrode, said second current being variable from approximately zero to a value whereby the sum of said first and second currents corresponds to the current required to operate said laser at said modulated light intensity.

27. A method for operating a laser in either a digital or analog mode whereby the light output intensity of a laser, in the digital mode, is modulated to a constant value between said first and second levels and whereby the light output intensity of the laser, in the analog mode, is linearly modulated between said first and second levels comprising the steps of:

generating a light output from said laser which varies as a function of current therethrough for providing a light output which can be intensity modulated between first and second intensities by controlling said current between first and second levels;

providing a switch coupled to said laser for controlling the current flowing therethrough;

applying a first digital control signal of a first value to said switch wherein said switch responds by causing said current to be at said second level; and applying in said digital mode of operation a second digital control signal to said switch wherein said switch responds by causing said current to be altered to a constant value between said first and second levels dependent upon the magnitude of said second digital control signal and for applying in said analog mode of operation an analog control signal to said switch wherein said switch responds by causing said current to be modulated between said first and second levels in accordance with the magnitude of said analog signal.

28. The method as defined in claim 27 further including the step of maintaining the laser light output intensity at a predetermined level.

29. The method as defined in claim 28 wherein said laser includes a cathode electrode associated therewith and said switch comprises a transistor the collector electrode of which is connected to said cathode electrode, the current through said laser being carried by the emitter of said transistor and controlled in a manner whereby the laser light output intensity is controlled.

30. The method as defined in claim 29 further including the steps of maintaining a first current through said transistor emitter electrode, the first current being constant and corresponding to the current required to operate said laser at said first light intensity, and maintaining a second current through said transistor emitter electrode, said second curent being variable from approximately zero to a value whereby the sum of said first and second currents corresponds to the current required to operate said laser at said modulated light intensity.

* * * * *